(12) United States Patent
Park et al.

(10) Patent No.: US 6,654,358 B1
(45) Date of Patent: Nov. 25, 2003

(54) METHOD FOR TRANSMITTING POWER CONTROL SIGNAL IN MOBILE COMMUNICATION SYSTEM

(75) Inventors: Jin-Soo Park, Seoul (KR); Hee-Won Kang, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/348,535

(22) Filed: Jul. 7, 1999

(30) Foreign Application Priority Data

Jul. 7, 1998 (KR) .......................................... 98-27737

(51) Int. Cl.[7] .............................................. H04B 7/185
(52) U.S. Cl. ....................... 370/318; 370/337; 370/350; 370/320; 370/335; 370/342; 455/522; 455/69; 455/517; 455/13.1; 455/13.2; 455/13.3
(58) Field of Search ................................. 370/320, 335, 370/342, 441, 318, 337, 350; 455/522, 69, 517, 13.1, 13.2, 13.3, 13.4

(56) References Cited

U.S. PATENT DOCUMENTS 5,566,165 A * 10/1996 Sawahashi et al. ......... 370/311
5,751,763 A * 5/1998 Bruckert ..................... 370/200
6,341,224 B1 * 1/2002 Dohi et al. .................. 455/522
6,385,184 B2 * 5/2002 Kitade et al. ............... 370/337
6,487,188 B1 * 11/2002 Kitade et al. ............... 370/337
6,490,263 B2 * 12/2002 Kitade et al. ............... 370/337
6,526,032 B1 * 2/2003 Kitade et al. ............... 370/337

* cited by examiner

*Primary Examiner*—William Trost
*Assistant Examiner*—Danh C. Le
(74) *Attorney, Agent, or Firm*—Dilworth & Barrese LLP

(57) ABSTRACT

A method for transmitting a power control signal in a mobile communication system. By altering the power control subchannel, the method reduces the delay between power measurement and power control by one power control group (PCG) in comparison with the conventional method. The power control subchannel is moved within the power control group so that a time equal to generating the power control bit is before the power control bit and a time equal to the sum of the round-trip propagation delay between base station and mobile unit and the time needed to perform gain control is after the power control bit.

5 Claims, 6 Drawing Sheets

METHOD FOR TRANSMITTING POWER CONTROL SIGNAL IN MOBILE COMMUNICATION SYSTEM

PRIORITY

This application claims priority to an application entitled "Method for Transmitting Power Control Signal in Mobile Communication System" filed in the Korean Industrial Property Office on Jul. 7, 1998 and assigned Serial No. 98-27737, the contents of which are hereby incorporated by reference.

BACKGROUND OF THE INVENTION

1. Field of the Invention

The present invention relates to a power control method in a CDMA (Code Division Multiple Access) mobile communication system, and more particularly, to a method for controlling the transmitting power of a forward link.

2. Description of the Related Art

Mobile communication systems perform power control in order to increase or decrease power of a transmission signal according to the condition of a radio link. To control the signal power transmitted from a base station, a closed loop method has been used. In this method, a mobile station measures the receiving power, compares it with a threshold value and informs the base station of the compared result by use of a power control bit on a reverse channel. Then, the base station increases or decreases transmission power by a prescribed step according to the value of the power control bit.

Such power control is performed once every time unit, whereby the time unit is known as a Power Control Group (PCG). The method of power control is as follows. If the base station transmits a signal, the mobile station receives the signal and measures the power of the received signal. The mobile station compares the measured value with a threshold value, generates a power control bit according to the compared result, and transmits the power control bit to the base station. The base station then reads the value of the power control bit and raises or lowers transmission power for the next power control group.

FIG. 1 illustrates a base station and a mobile station, for controlling the power of a forward link. The base station transmits at least one forward signal through a radio link directed to the mobile station. The mobile station transmits a signal including a reverse pilot signal through a radio link directed to the base station.

In a configuration of the base station, a baseband modulator 111 modulates transmission data. A gain multiplier 113 multiplies an output of the modulator 111 by a gain. An RF (Radio Frequency) modulator 115 modulates the output of the multiplier 113 into an RF signal. A demodulator 121 demodulates a signal received from the mobile station. A power control bit (PCB) extractor 123 extracts a power control bit from the output of the demodulator 121. A gain controller 125 uses the power control bit to determine the gain and supplies the gain to the multiplier 113.

In a configuration of the mobile station, a demodulator 151 demodulates a signal sent from the base station. A signal power measurer 153 measures the power of a signal output from the demodulator 151. A power control bit (PCB) generator 155 generates a power control bit from the measured power result. A power control bit multiplexer (PCB MUX) 157 multiplexes the power control bit and a pilot signal. An RF modulator 159 modulates the output of the PCB MUX 157 into an RF signal.

To control power in a mobile communication system having the above-described configuration, the mobile station multiplexes the power control bit onto a reverse pilot channel. Therefore, the mobile station transmits to the base station a reverse pilot channel signal including the multiplexed power control bit (i.e., a power control subchannel).

FIG. 2 illustrates configurations of the PCB MUX 157 shown in FIG. 1 and the power control subchannel multiplexed over the reverse pilot channel (refer to "THE CDMA 2000 RTT CANDIDATE SUBMISSION", TR45.5, June 1998).

Referring to FIG. 2, a symbol repeater 211 spreads the power control bit output from the power control bit generator 155 to 384×4 chips. A multiplexer (MUX) 213 inserts the power control bit into the fourth power control subchannel duration in a power control group indicated by a reference numeral 125.

Therefore, the pilot channel for a reverse dedicated channel, output from the PCB MUX 157, is comprised of a pilot signal having a fixed reference value and the multiplexed forward power control data as shown by the reference numeral 215 in FIG. 2. The time-multiplexed forward power control data is represented by the power control subchannel. The power control subchannel provides information about the condition of the forward link at a rate of one bit per 1.25 ms power control group (PCG). The base station controls the transmitting power of the forward link channels using this information. The power control bit is maintained at the same value during a symbol interval where one bit value is repeated through power control symbol repetition. The pilot signal is always +1 (or −1), and the power control bit is +1 or −1. The reverse pilot channel over which the power control subchannel is multiplexed shows that one power control group is divided into 4 power control subchannel durations as shown in FIG. 2 and the power control bit is positioned at the end in time within one power control group.

FIG. 3 is a diagram illustrating a power control process on a time basis using the power control subchannel shown in FIG. 2.

If the base station transmits a signal in a power control group unit (BS Tx), the mobile station receives this signal with a slight propagation delay (MS Rx). The mobile station measures the power of the received signal, generates a power control bit, and transmits the power control bit to the base station during the next power control group (MS Tx). The base station receives a signal including the power control bit in a power control group unit (BS Rx). Upon receipt of the power control bit, the base station waits until the start point of the next power control group to control the power according to the received power control bit (APPLY PC of BS Tx). Consequently, a delay from the measurement of the transmitting power to the control thereof by the base station is nearly two power control groups (MEASUREMENT-TO-CONTROL DELAY). Therefore, the conventional power control method has a disadvantage in that a time for controlling the transmitting power of the forward link is delayed by the structure of the power control subchannel in which the power control bit is inserted into the last (i.e., fourth) power control subchannel duration of the power control group as illustrated by the reference numeral 215 in FIG. 2.

SUMMARY OF THE INVENTION

An object of the present invention is to provide a method wherein a mobile station can transmit a power control bit so as to minimize a delay while a base station controls forward transmitting power in a mobile communication system.

Another object of the present invention is to provide a method wherein a mobile station can multiplex a power control bit multiplexed onto a reverse pilot channel at the inner part of a power control group duration in a CDMA mobile communication system.

To achieve the above objects, a method for transmitting a power control bit from a mobile station in a CDMA mobile communication system includes the steps of measuring a signal-to-interference ratio of a received signal, comparing the signal-to-noise ratio with a threshold value to generate a power control bit, and multiplexing the power control bit at a given duration among inner durations of a reverse pilot channel of a power control group to be transmitted next and transmitting the multiplexed power control bit to a base station.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings.

Figure 1:
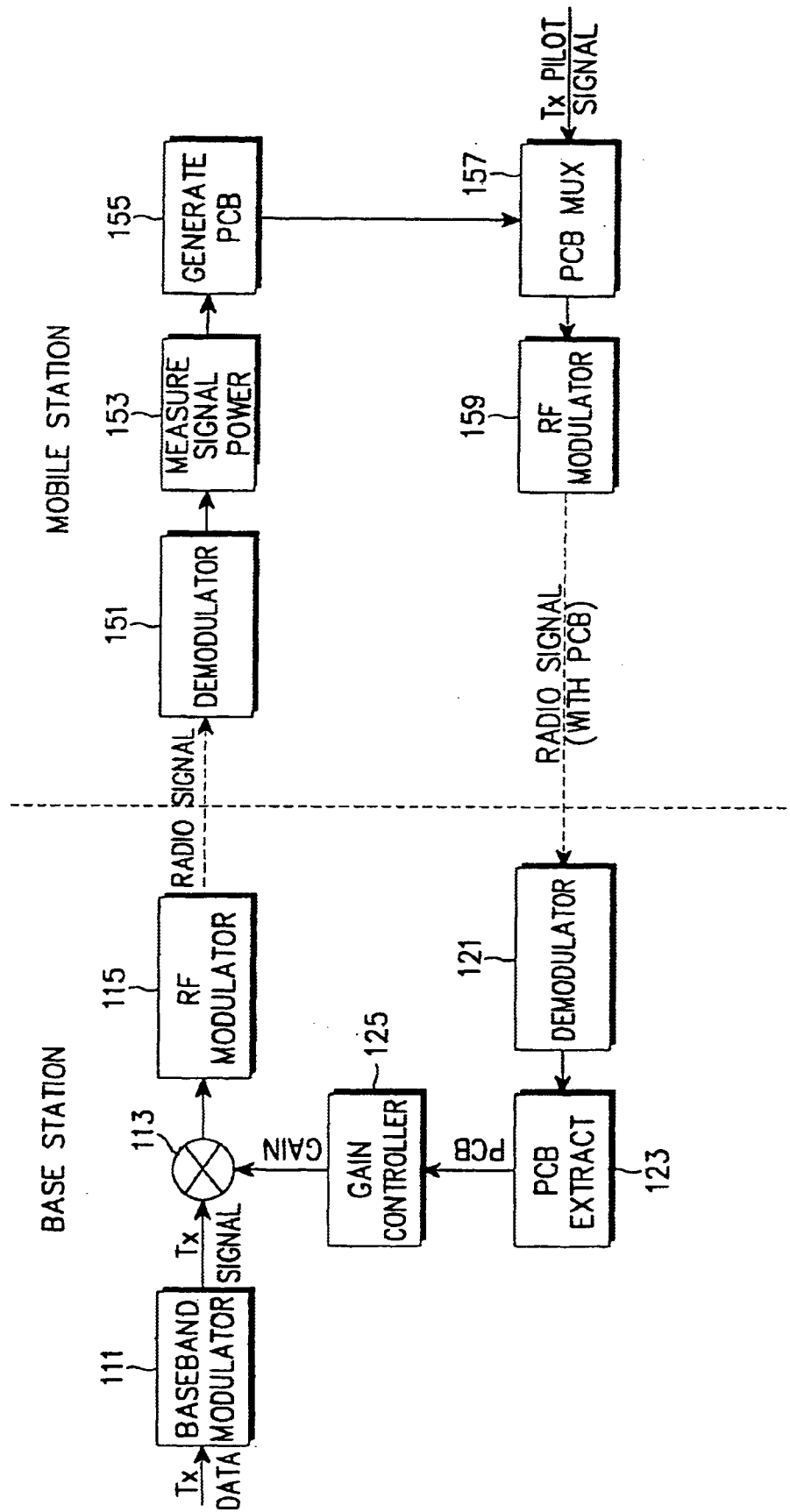
FIG. 1 is a block diagram of a mobile communication system for power control of a forward link.
Figure 2:
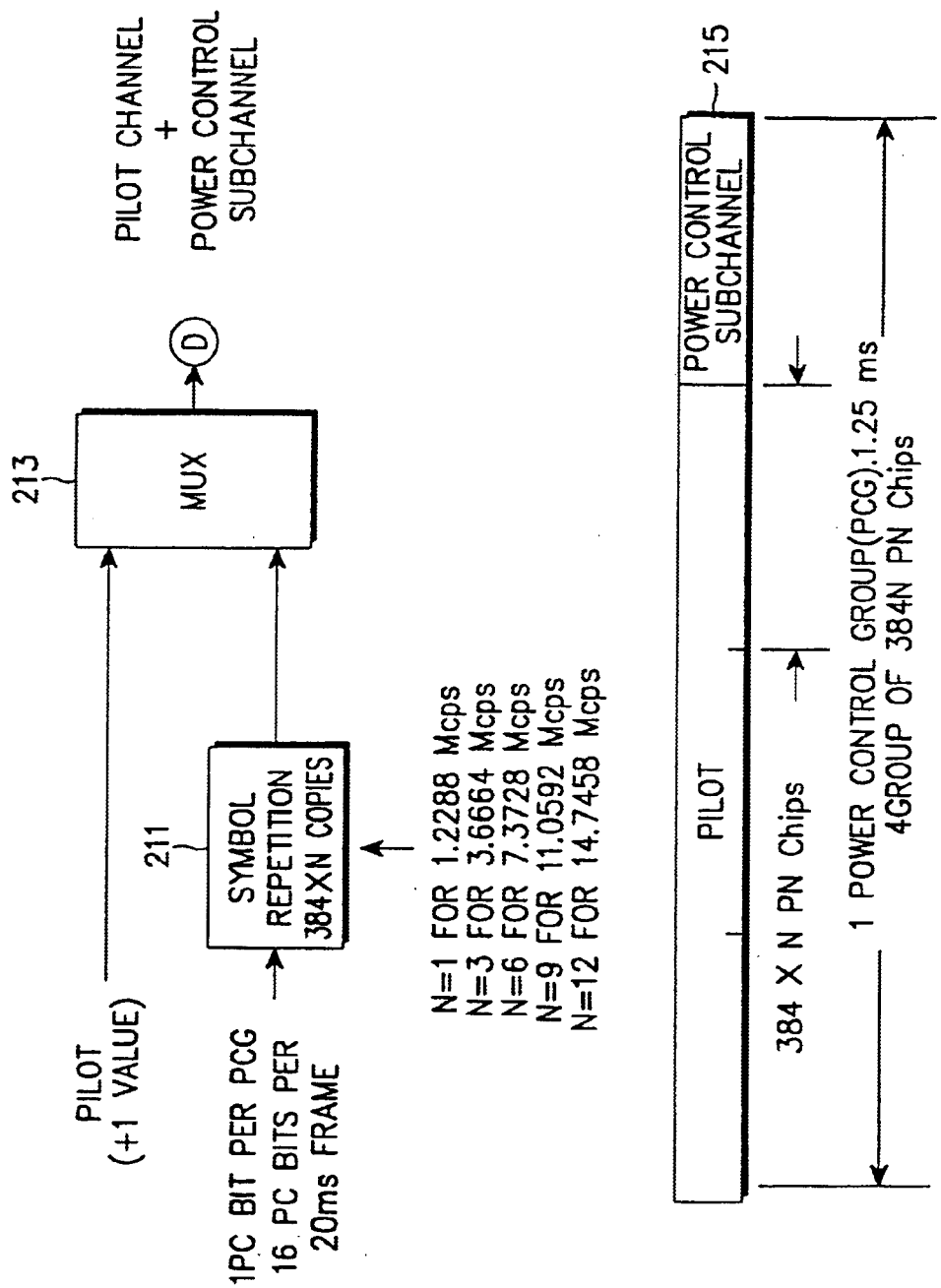
FIG. 2 is a diagram illustrating a conventional power control subchannel multiplexed over a reverse pilot channel.
Figure 3:
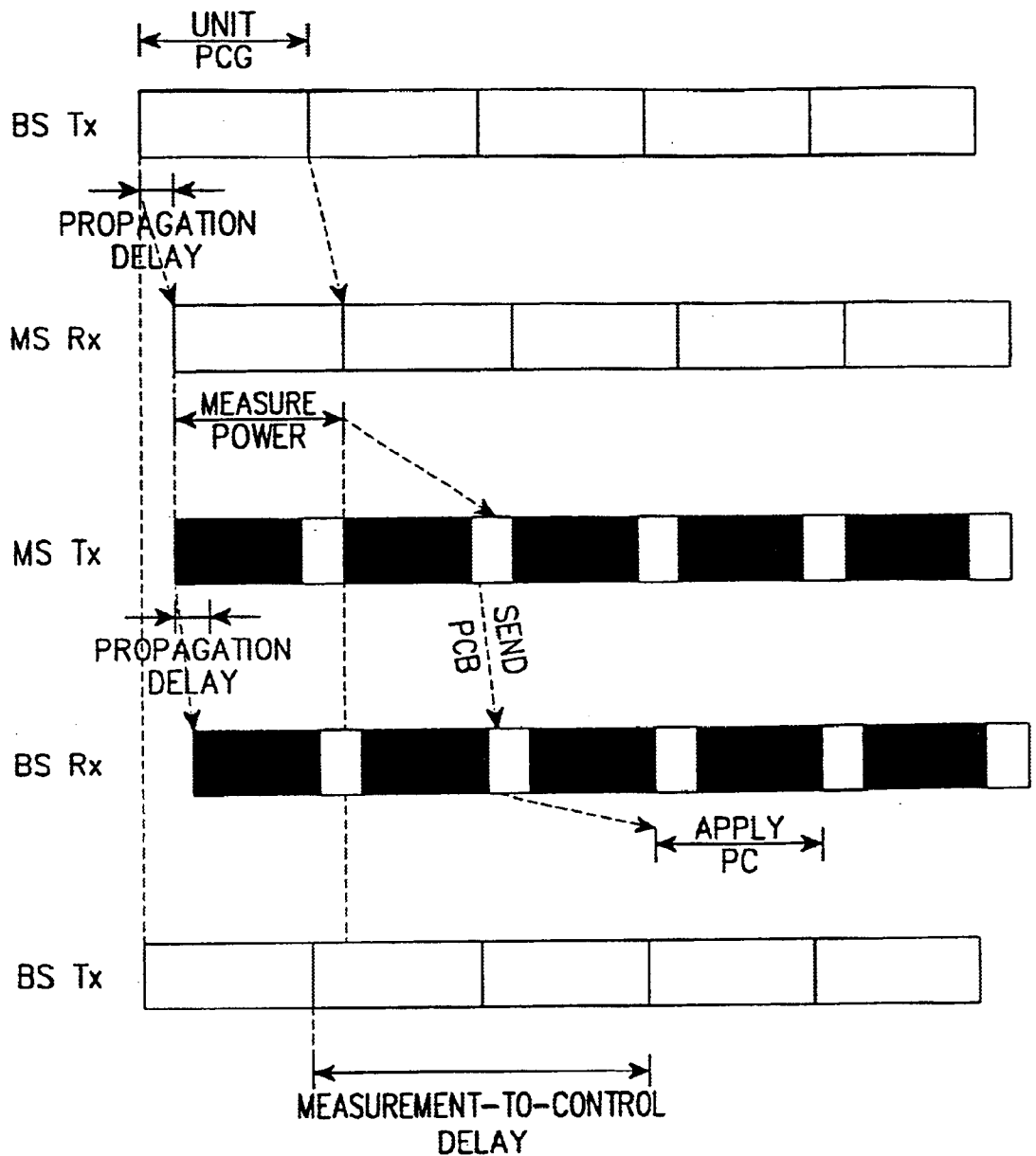
FIG. 3 is a diagram illustrating a power control process on a time basis using the power control subchannel shown in FIG. 2.
Figure 4:
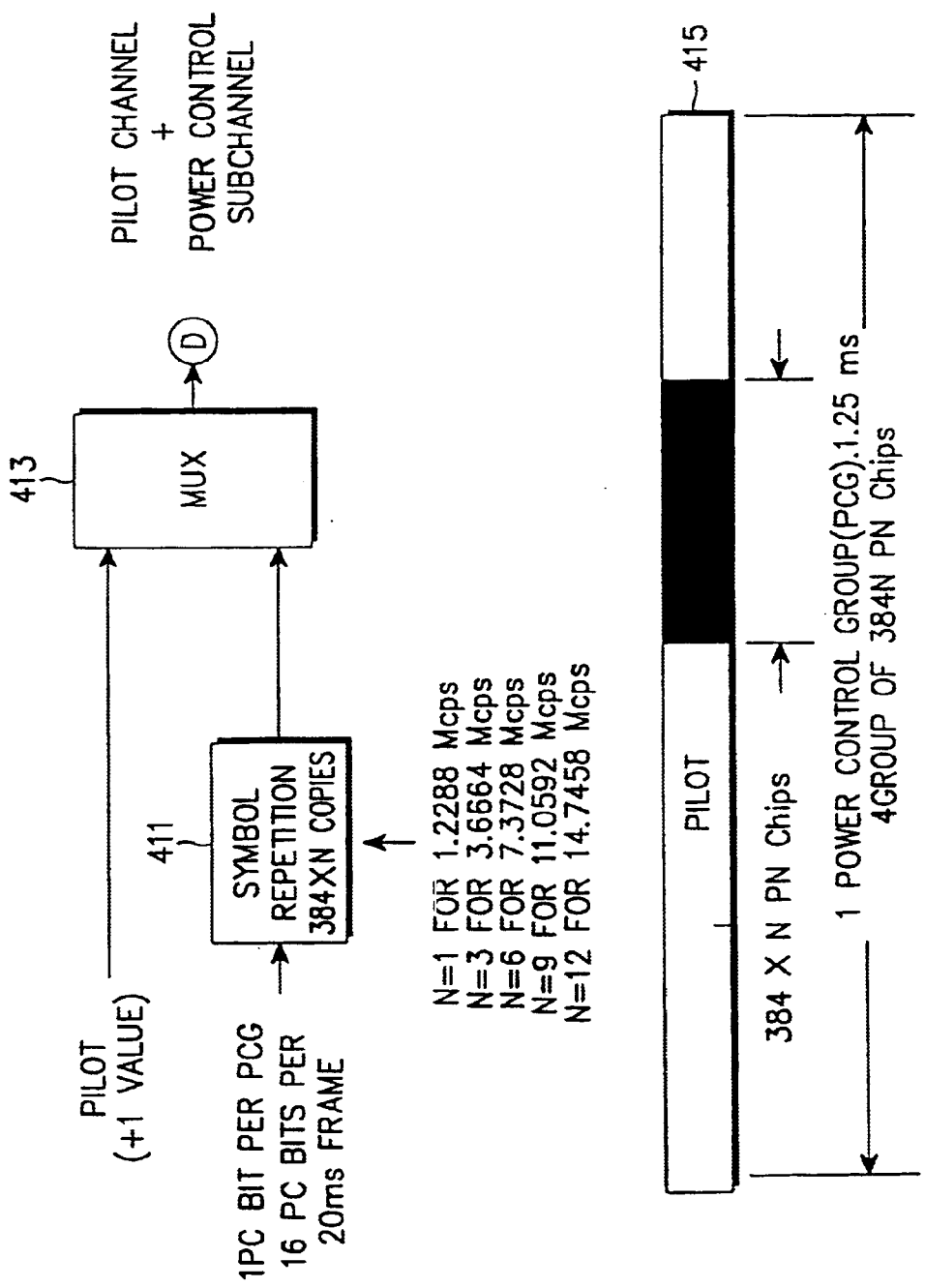
FIG. 4 is a diagram illustrating a configuration of a power control subchannel multiplexed over a reverse pilot channel according to the present invention.

Referring to FIG. 4, the pilot channel for a reverse dedicated channel is comprised a pilot signal having a fixed reference value and multiplexed forward power control data. The time-multiplexed forward power control information is represented by a power control subchannel. The power control subchannel provides information about the condition of a forward link at a rate of one bit per 1.25 ms power control group (PCG). The base station controls the transmitting power of forward link channels using this power control information. Hereinafter, the power control information will be referred to as the power control bit. The power control bit is maintained at the same value during a symbol interval where one bit value is repeated through power control symbol repetition by a symbol repeater 411. The pilot signal is always +1 (or −1), and the power control bit is +1 or −1.

In the power control subchannel multiplexed over a reverse pilot channel in accordance with an embodiment of the present invention, a power control bit is positioned between pilot signals situated at the front and rear on a time basis within one power control group, as shown by reference number 415 in FIG. 4. The reference numeral 415 in FIG. 4 shows that the power control bit is located at a third duration of the power control group divided into 4 durations so that it is possible to transmit a predetermined number of pilot signals before and after the power control bit.

For example, before transmitting the power control bit, the pilot signals should be transmitted over the time required to generate the power control bit after the end of power measurement; after transmitting the power control bit, the pilot signals should be transmitted over the time equal to the maximum round-trip propagation delay time between a base station and a mobile station and the time required in performing gain control after receiving the power control bit within a power control group. Setting the time-multiplexing position of the power, control bit over the reverse pilot channel is achieved by controlling the MUX 157 of a reverse channel transmitter in a mobile station.

To allow the MUX 157 to receive the pilot signal and power control bit signal and switch between them for output, there is provided a timer for designating the position where the power control bit is output. For example, for the multiplexing scheme shown by reference numeral 415 in FIG. 4, the pilot signal is output for 2×(384×N) chips (one chip=1/(N×1.2288×10$^6$)), the power control bit is output for (384×N) chips, and the pilot is again output for (384×N) chips.

Figure 5:
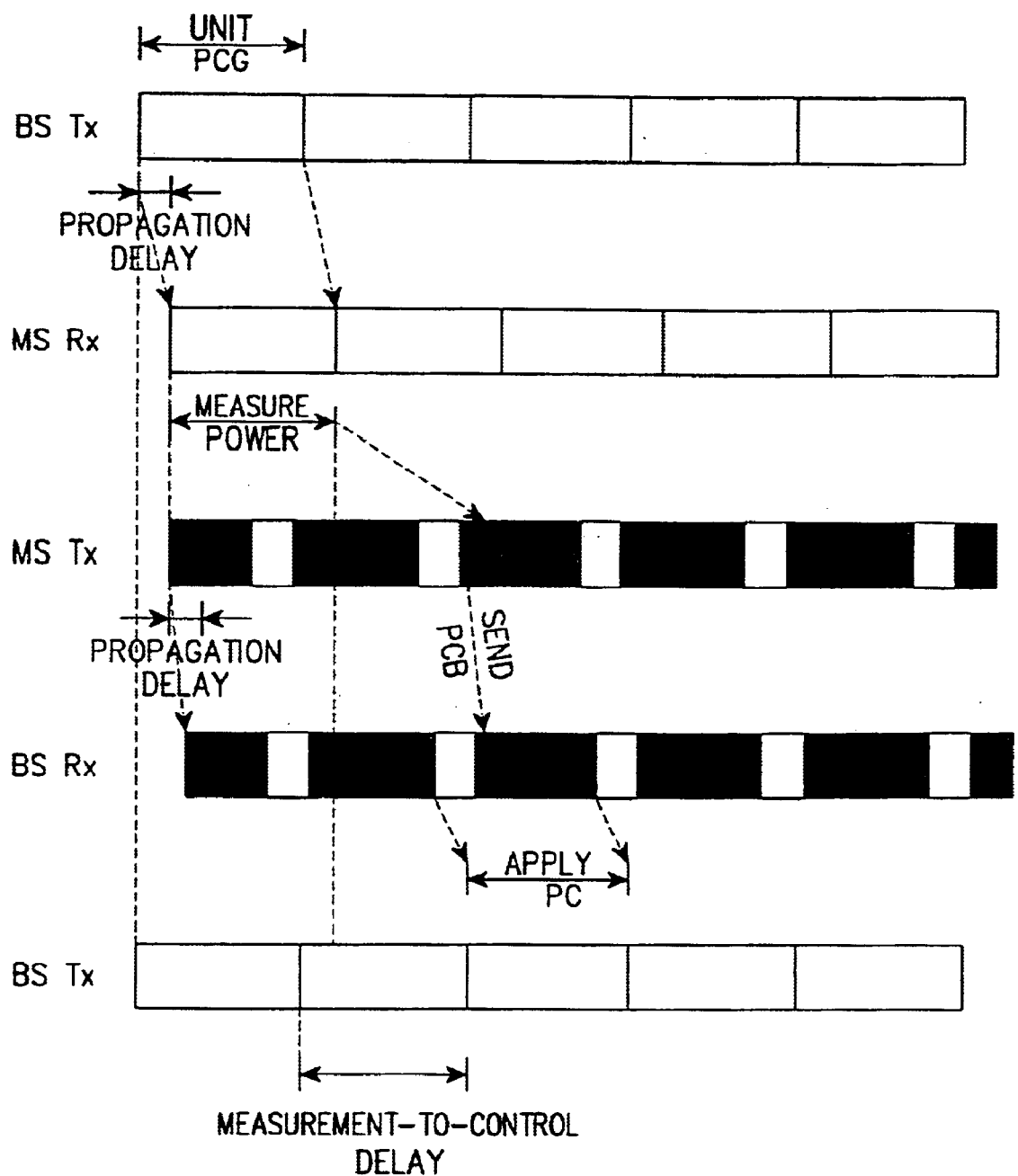
FIG. 5 is a diagram illustrating a power control process on a time basis using the power control subchannel shown in FIG. 4.

FIG. 5 illustrates the power control process over time using the power control subchannel shown in FIG. 4. If the base station transmits a signal in a power control group unit (BS Tx), the mobile station receives this signal with a slight propagation delay (MS Rx). The mobile station measures the power of the received signal, generates the power control bit, and transmits the power control bit to the base station during the next power control group (MS Tx). The base station then receives the power control bit with a slight propagation delay in a power control group unit (BS Rx). Since the proposed power control subchannel advances the position of the power control bit, the power control group after the power control group that generated the power control bit is still in progress. Therefore, power control can be applied to the next power control group (APPLY PC of BS Tx). That is, the base station can alter the transmitting power of the next power control group faster than the conventional method by one power control group. A delay from measurement of the transmitting power to control thereof is within one power control group (MEASUREMENT-TO-CONTROL DELAY).

Figure 6:
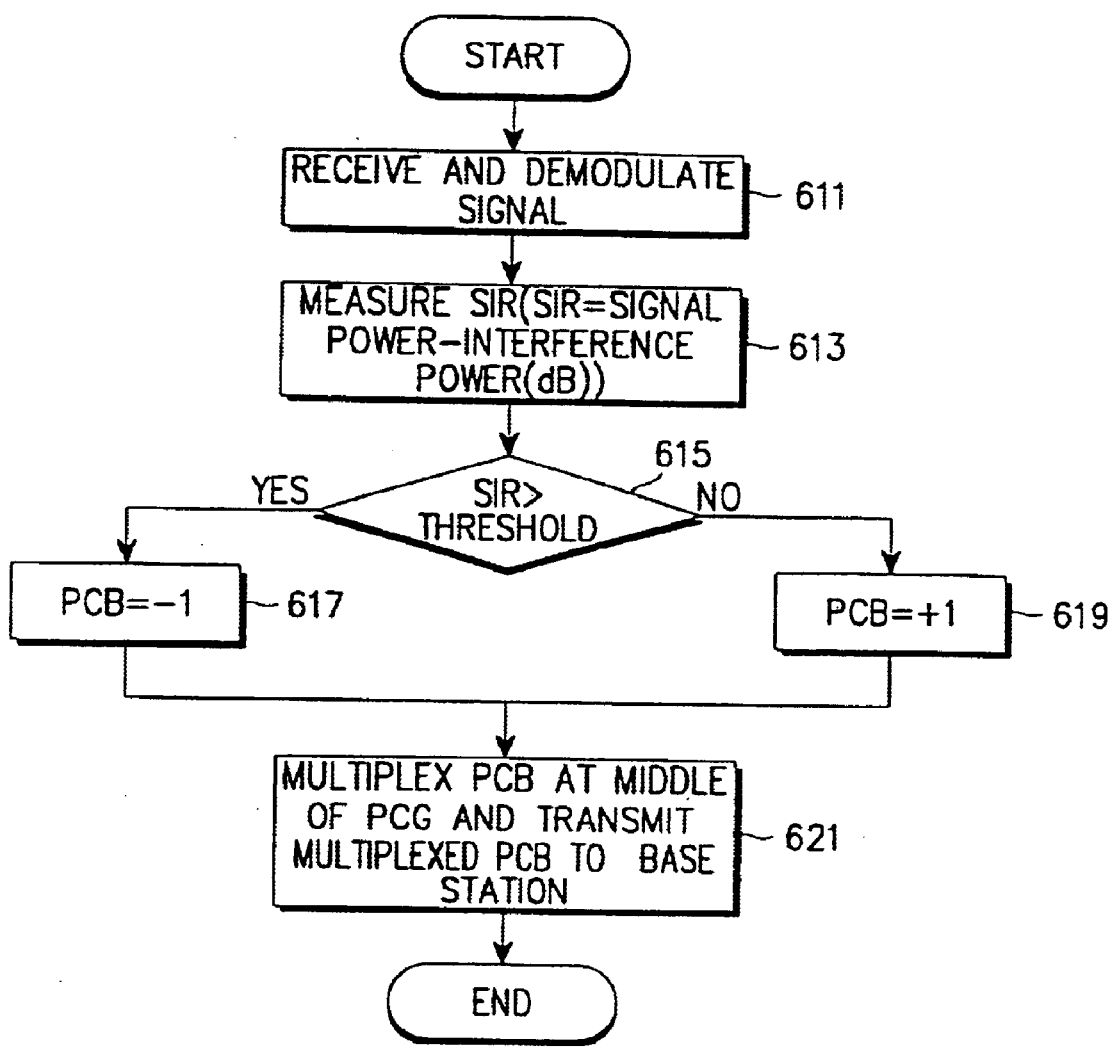
FIG. 6 is a flow chart illustrating a power control process executed by a mobile station.

FIG. 6 is a flow chart illustrating a power control process executed by the mobile station. The mobile station receives and demodulates a signal at step 611, and measures power of the received signal and power of the interference signal to obtain a signal-to-interference ratio (SIR) at step 613. The SIR is compared with a threshold value at step 615. If the SIR is greater than the threshold value, the mobile station generates the power control bit of −1 at step 617, and if not, it generates the power control bit of +1 at step 619. The mobile station multiplexes the power control bit to the pilot signal at the inner part of the power control group of the reverse pilot subchannel to be transmitted subsequently and transmits the multiplexed result to the base station, at step 621.

As described above, the inventive power control method using the power control subchannel of the new structure can reduce the delay from power measurement to power control by a time period of one power control group in comparison with the conventional method.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting a power control bit from a mobile station in a CDMA (Code Division Multiple Access) mobile communication system having a base station for extracting a power control bit received through a reverse pilot channel and controlling the transmitting power of a forward link, comprising the steps of:

measuring a signal-to-interference ratio of a received signal;

comparing the signal-to-noise ratio with a threshold value to generate a power control bit; and multiplexing the power control bit and pilot signals of a power control group of the reverse pilot channel and transmitting the multiplexed pilot signal and power control bit to a base station through the reverse pilot channel, wherein the multiplexing inserts the power control bit into a position within the power control group of the reverse pilot channel so that the pilot signals are located before and after the power control bit, and the pilot signals after the power control bit have a time period greater than a maximum round-trip propagation delay time between the base station and the mobile station.

2. The method as claimed in claim 1, wherein the power control group is divided into 4 durations, and the given duration among the inner durations is the third duration.

3. A device for transmitting a power control bit from a mobile station in a CDMA mobile communication system, comprising:

a measurer for measuring a signal-to-interference ratio of a received signal;

a power control bit generator for comparing the signal-to-noise ratio with a threshold value to generate a power control bit;

a multiplexer for multiplexing the power control bit and pilot signals of a power control group of the reverse pilot channel; and a reverse pilot channel transmitter for transmitting the multiplexed pilot signal and power control bit to a base station through the reverse pilot channel, wherein the multiplexer inserts the power control bit into a position within the power control group of the reverse pilot channel so that the pilot signals are located before and after the power control bit, and the pilot signals after the power control bit have a time period greater than a maximum round-trip propagation delay time between the base station and the mobile station.

4. The device as claimed in claim 3, wherein the multiplexer inserts the power control bit into the third duration in the power control group divided into 4 durations.

5. The device as claimed in claim 3, wherein the multiplexer inserts the power control bit among the pilot signals of the power control group of the reverse pilot channel at a position calculated to minimize a delay between transmission of a power measurement and transmission of a power control.

* * * * *